(12) United States Patent
Asada (10) Patent No.: US 7,733,244 B2
(45) Date of Patent: Jun. 8, 2010

(54) NAVIGATION SYSTEM

(75) Inventor: Hiroshige Asada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 587 days.

(21) Appl. No.: 11/724,169

(22) Filed: Mar. 15, 2007

(65) Prior Publication Data

US 2007/0233370 A1    Oct. 4, 2007

(30) Foreign Application Priority Data

Mar. 30, 2006  (JP)  ............................. 2006-095348
Jul. 24, 2006  (JP)  ............................. 2006-201050

(51) Int. Cl.
*G08G 1/123*        (2006.01)

(52) U.S. Cl. ..................... 340/995.1; 701/211; 382/106

(58) Field of Classification Search .............. 340/995.1; 701/211; 382/106
See application file for complete search history.

(56) References Cited

U.S. PATENT DOCUMENTS

| | | | | |
|---|---|---|---|---|
| 5,913,918 | A * | 6/1999 | Nakano et al. ............... | 701/208 |
| 5,936,631 | A * | 8/1999 | Yano et al. ................... | 345/428 |
| 6,061,628 | A * | 5/2000 | Hayashi et al. .............. | 701/208 |
| 6,201,883 | B1 * | 3/2001 | Mizui .......................... | 382/109 |
| 6,202,026 | B1 * | 3/2001 | Nimura et al. ............... | 701/211 |
| 6,282,490 | B1 * | 8/2001 | Nimura et al. .......... | 340/995.14 |
| 6,321,158 | B1 * | 11/2001 | DeLorme et al. ............. | 701/201 |
| 6,462,674 | B2 * | 10/2002 | Ohmura et al. .............. | 340/901 |
| 7,146,272 | B2 * | 12/2006 | Yanagidaira et al. ........ | 701/207 |
| 7,277,846 | B2 * | 10/2007 | Satoh ............................ | 704/3 |
| 7,353,110 | B2 * | 4/2008 | Kim ............................. | 701/211 |
| 2001/0037203 | A1 * | 11/2001 | Satoh .......................... | 704/270 |
| 2005/0071082 | A1 * | 3/2005 | Ohmura et al. .............. | 701/211 |
| 2005/0093719 | A1 * | 5/2005 | Okamoto et al. ......... | 340/995.1 |
| 2005/0107952 | A1 * | 5/2005 | Hoshino et al. .............. | 701/211 |
| 2005/0182564 | A1 * | 8/2005 | Kim .............................. | 701/211 |
| 2005/0209776 | A1 * | 9/2005 | Ogino .......................... | 701/211 |
| 2006/0129636 | A1 * | 6/2006 | Matsuura et al. ............. | 709/203 |
| 2007/0150173 | A1 * | 6/2007 | Neef et al. .................... | 701/200 |
| 2007/0185644 | A1 * | 8/2007 | Hirose ......................... | 701/200 |
| 2007/0198183 | A1 * | 8/2007 | Morimoto et al. ........... | 701/211 |
| 2007/0233370 | A1 * | 10/2007 | Asada ......................... | 701/208 |

FOREIGN PATENT DOCUMENTS

| | | |
|---|---|---|
| JP | A-09-304101 | 11/1997 |
| JP | A-2001-249024 | 9/2001 |
| JP | A-2002-372433 | 12/2002 |
| JP | A-2004-257979 | 9/2004 |

* cited by examiner

*Primary Examiner*—Daniel Wu
*Assistant Examiner*—Bradley E Thompson
(74) *Attorney, Agent, or Firm*—Posz Law Group, PLC

(57) ABSTRACT

A navigation system having a camera captures a front view image for guiding a driver of a vehicle to a destination. A portion of the front view image is identified as a destination image area, and the destination image area is marked by an arrow based on a processing in the navigation system. Then, the front view image with destination marking is displayed on a monitor for guiding the driver.

6 Claims, 8 Drawing Sheets

NAVIGATION SYSTEM

CROSS REFERENCE TO RELATED APPLICATION

This application is based on and claims the benefit of priority of Japanese Patent Applications No. 2006-95348 filed on Mar. 30, 2006, and No. 2006-201050 filed on Jul. 24, 2006, the disclosure of which is incorporated herein by reference.

FIELD OF THE INVENTION

The present invention generally relates to an automobile navigation system for use in a vehicle.

BACKGROUND INFORMATION

In recent years, a navigation system is provided for an automotive vehicle to guide a driver to a preset destination. The navigation system typically displays a current position of the vehicle and a destination of a travel as well as a navigation route between the current position and the destination. When the vehicle approaches the destination, the driver tries to associate the destination displayed on the navigation system with a view from the vehicle to identify, for example, a building, a park or the like on the destination.

Currently, a navigation system disclosed in Japanese patent document JP-A-2001-249024 displays a matching facility image stored in a memory to facilitate association of the destination with the view from the vehicle when the vehicle approaches the destination. Another navigation system disclosed in Japanese patent document JP-A2002-372433 discloses a technique that marks the destination displayed on the navigation system with a certain destination mark.

However, matching operation of the destination on the map with the view from the vehicle by the driver, and/or matching the facility image with the view from the vehicle cannot be totally eliminated by the techniques disclosed in the above patent documents. Further, distraction of driver's attention from driving operation cannot be prevented due to the manner by which destination information is provided for the driver.

SUMMARY OF THE INVENTION

In view of the above and other problems, the present invention provides a navigation apparatus that provides route navigation for a driver of a vehicle in a non-distracting manner.

The navigation apparatus for providing a navigation route toward a destination for a vehicle includes a camera for capturing an image of a front view of the vehicle, a monitor for displaying the image of the front view of the vehicle, a position detector for detecting a current position of the vehicle, a direction sensor for sensing an imaging direction of the camera, a destination position setting unit for specifying a destination image section in correspondence to the destination in the image of the front view captured by the camera, a processing unit for processing the image of the front view for viewing on the monitor. The camera aims in the imaging direction sensed by the direction sensor and the processing by the first processing unit adds a graphic effect indicative of the destination position to the image of the front view.

In this manner, the navigation apparatus displays the image on the monitor that has a destination marking graphic effect for marking the destination in the image of the front view, thereby enabling the driver to intuitively recognize the position of the destination without effort. Therefore, the driver's attention is not overly distracted from driving operation. Further, the navigation is based on a current image captured by the camera, thereby being adaptable for a navigation to any destination including a place visited for the first time. Furthermore, the front view image captured by the camera is easily understood by the driver due to its similarity to a real situation where the driver is acting in.

BRIEF DESCRIPTION OF THE DRAWINGS

Other objects, features and advantages of the present invention will become more apparent from the following detailed description made with reference to the accompanying drawings, in which.

DETAILED DESCRIPTION

Preferred embodiments of the present invention will now be described with reference to the accompanying drawings.

Figure 1:
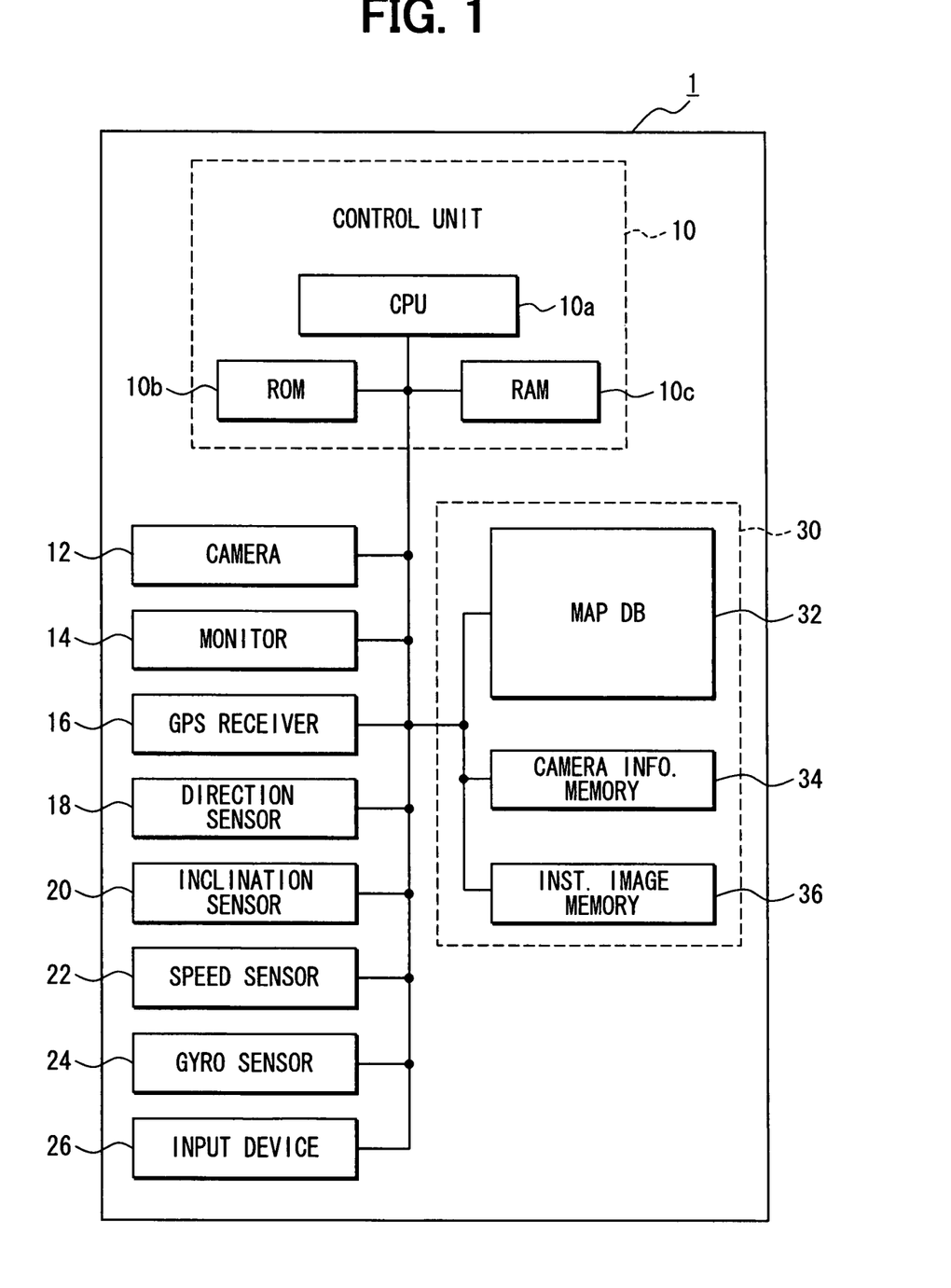
FIG. 1 shows a block diagram of a car navigation apparatus in an embodiment of the present disclosure.
Figure 2:
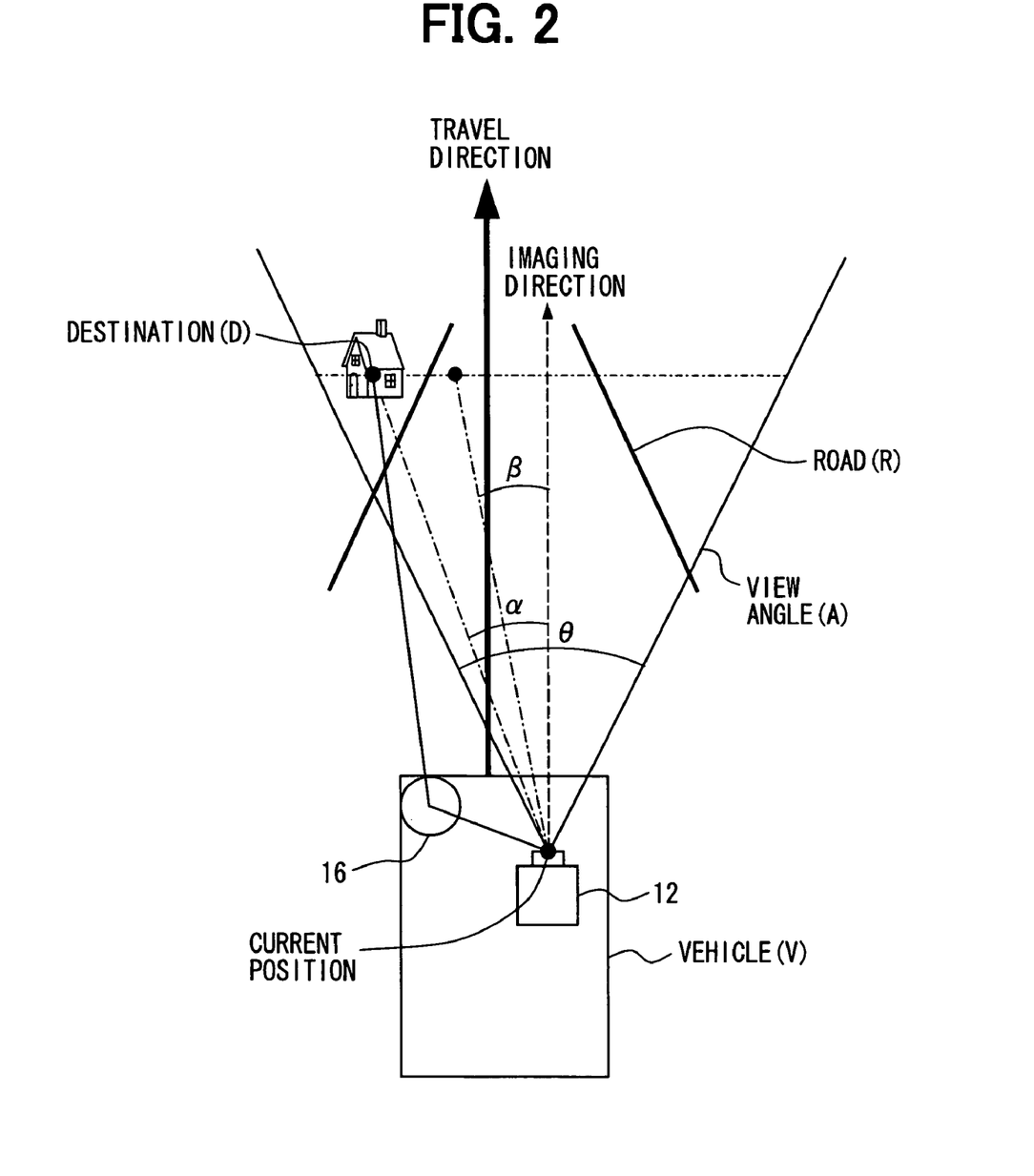
FIG. 2 shows an illustration of a view angel of a camera in the car navigation apparatus relative to a travel direction of a vehicle.

FIG. 1 shows a block diagram of a car navigation apparatus 1 in an embodiment of the present disclosure. FIG. 2 shows an illustration of the car navigation apparatus 1 in the embodiment relative to parameters such as a destination, a current position, a view angle and an imaging direction.

The car navigation apparatus 1 includes, as shown in FIG. 1, a control unit 10, a camera 12, a monitor 14, a GPS receiver 16, a direction sensor 18, an inclination sensor 20, a speed sensor 22, a gyro sensor 24, an input device 26, and a memory 30. In this case, the camera 12, the GPS receiver 16, and the speed sensor 22 are disposed at predetermined positions in a vehicle (described later), and the other parts are installed in the car navigation apparatus 1. The body of the car navigation apparatus 1 is disposed on an instrument panel (not shown in the figure) on a position that is between a driver's seat and a navigator's seat.

The control unit 10 is a computer that includes a CPU 10a, a ROM 10b, and a RAM 10c. The control unit 10 is coupled with each of the above parts 12 to 30 through a bus 99. The control unit 10 can communicate with the parts 12 to 30 through the bus 99. More practically, the CPU 10a in the control unit 10 communicates with the parts 12 to 30 for performing various operations described later based on executing programs stored in the ROM 10b.

The camera 12 is disposed on the vehicle with a sun visor for imaging a front view of the vehicle in the present embodiment.

The monitor 14 is installed in the navigation apparatus 1, and a monitor screen in the monitor 14 faces a driver and other passengers in the vehicle.

The GPS receiver 16 is disposed at a certain position in the vehicle, and receives a position signal from a GPS satellite. The control unit 10 of the navigation apparatus 1 calculates a current position of the vehicle based on the position signal received by the receiver 16. The control unit 10 updates the current position stored in the RAM 10c at a certain interval. Therefore, the latest position of the vehicle is always stored in the RAM 10c of the control unit 10.

The direction sensor 18 detects a direction of the vehicle based on a geomagnetism, and the inclination sensor 20 detects an inclination of the vehicle in a vertical direction. The gyro sensor 24 detects an orientation of the vehicle. The speed sensor 22 detects a speed of the vehicle. The navigation apparatus 1 utilizes a sensor for displaying a vehicle speed in a speedometer as the speed sensor 22. The control unit 10 detects a direction, an inclination and an orientation of the vehicle based on various signals derived from the sensors 18 to 24.

The input device 26 is a human interface that handles user operation for controlling the navigation apparatus 1. The input device is operable by a user in the vehicle when the apparatus 1 is disposed on the instrument panel.

The memory 30 is a hard disk driver (HDD) installed in the navigation apparatus 1, an IC memory and/or the like for storing information. The memory 30 in the present embodiment stores at least map information, camera related information, instruction image information in a certain area.

Among the information described above, the map information not only includes buildings, parks, parking but also includes road related information such as road position, road width and the like. The camera related information includes a view angle of the camera 12 and other information. An instruction image is a graphic image such as an arrow and the like displayed in an image for setting process described later, and the instruction image information is data for displaying the graphic image.

In the memory 30, as shown in FIG. 1, the map information is stored in a map database (DB) 32, the camera related information is stored in a camera information memory 34, and the instruction image information is stored in an instruction image memory 36.

The imaging direction and the view angle is described with reference to FIG. 2. Though parameters for controlling the imaging direction and the view angle are three-dimensional, the description in the following only describes the parameter in two dimension for the simplification.

The imaging direction toward the destination (D) is, as shown in FIG. 2, a direction in parallel with a travel direction of the vehicle. That is, a front direction of the vehicle (V) on the road (R) is the imaging direction. The imaging direction is, in the present embodiment, calculated based on information derived from the direction sensor 18, the inclination sensor 20, and the gyro sensor 24.

When the camera 12 capture a front view of the vehicle in the imaging direction, the captured image includes a conical area around the imaging direction. The view angle (A) indicates an apex angle of the conical area. The value of the view angle is denoted as $\theta$ in the present embodiment.

Figure 3:
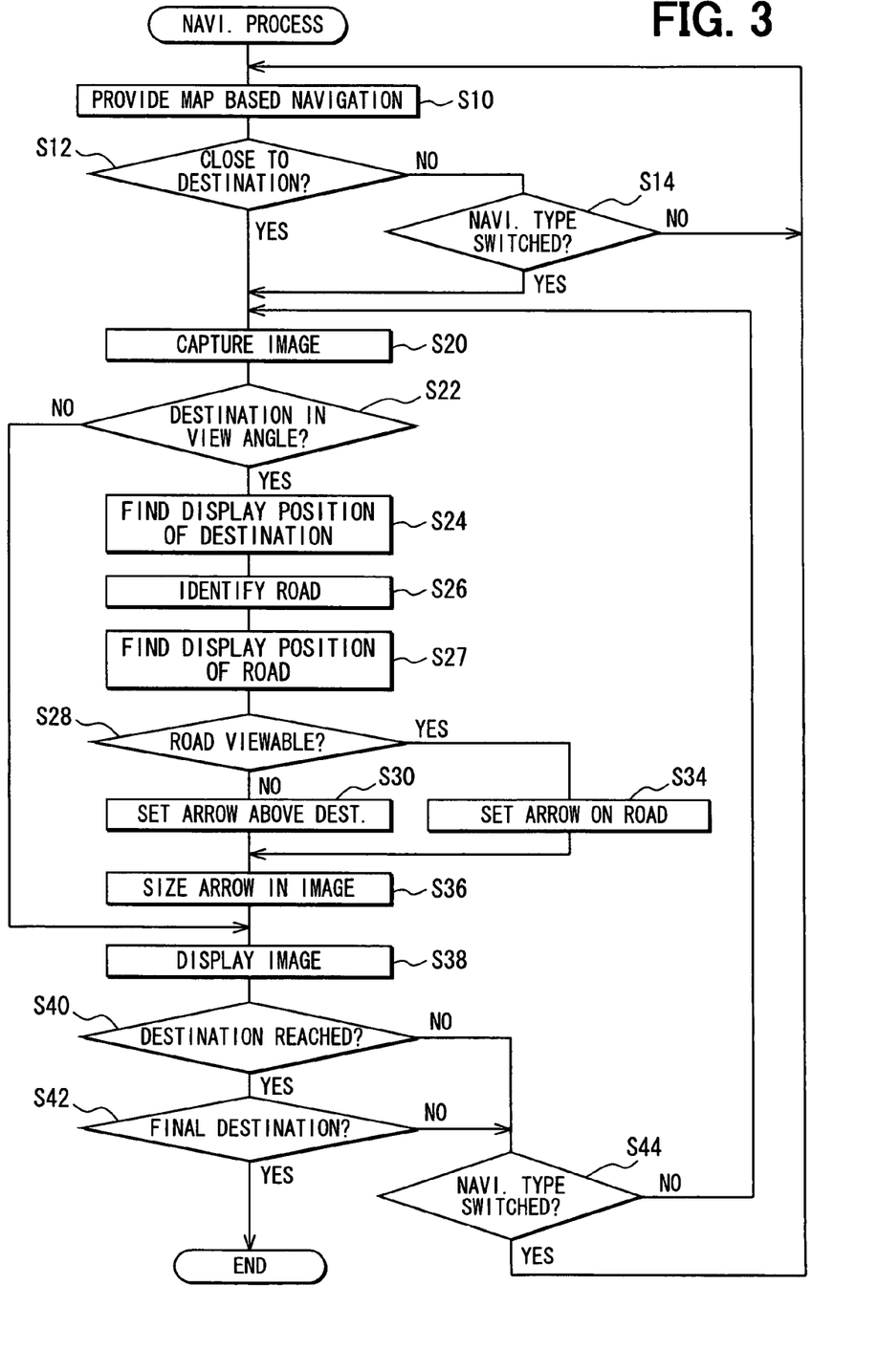
FIG. 3 shows a flowchart of navigation process of the car navigation apparatus.

A navigation process in the navigation apparatus 1 is described with reference to FIG. 3. The flowchart in FIG. 3 is a step-by-step description of the navigation process.

The navigation process starts after a destination setting and other stop-by place settings on a route to the destination. More practically, when the destination attribute such as a destination name, a destination address or the like is inputted by the input device 26, the navigation apparatus 1 is configured to store the position information of the destination in the RAM 10c. The input process of the destination attribute and calculation of the position information are omitted due to its obviousness.

When the navigation process starts in the navigation apparatus 1, a general navigation with a map is provided for the user in step S10. More practically, route information between a current position and the destination is stored in the RAM 10c based on the calculation of the route between the current position and the destination. Then, the current position is continuously updated to be displayed on the map with the route information on the monitor 14 based on map data retrieved from the map DB 32 under control of the control unit 10.

Then, the control unit 10 determines whether the vehicle approaches the destination in step S12. More practically, the control unit 10 determines whether the position information of the destination stored in the RAM 10c and the current position of the vehicle also stored in the RAM 10c are within a certain distance. When the two positions are determined to be within a predetermined distance (step S12:YES), the process proceeds to step S20. When two positions are determined not to be within the predetermined distance (step S12:NO), the process proceeds to step S14.

In step S14, the control unit 10 determines whether a switch instruction for switching a map based navigation to an image based navigation is inputted from the input device 26. When the switch instruction is determined to be inputted (step S14:YES), the process proceeds to step S20. When the switch instruction is determined not to be inputted (step S14:NO), the process returns to step S10.

In step S20, the control unit 10 uses the camera 12 for imaging a front view of the vehicle. Then, in step S22, the control unit 10 determines whether the approaching destination (determined in step S12) is within the view angle of the camera 12 relative to the imaging direction as shown in FIG. 2. When the destination is determined not to be within the view angle (step S22:NO), the process proceeds to step S38 (described later). When the destination is determined to be within the view angle (step S22:YES), the process proceeds to step S24.

In step S24, the control unit 10 calculates an angle a that is defined as a n angle between a direction toward the destination and the imaging direction based on the absolute coordinates of the current position and the absolute coordinate of the destination as well as the imaging direction. The calculation of the angle $\alpha$ is used to determine a display position of the destination. After the calculation of the display position, the process proceeds to step S26. In this case, as shown in FIG. 2, though the position of the GPS receiver 16 and the position of the camera 12 are different, the difference of the two positions is relatively smaller than the distance from the current position to the destination. Therefore, the position of the GPS receiver 16 is assumed to be the same as the position of the camera 12. However, the difference between the receiver position and the camera position may be taken into consideration for the above calculation.

In step S26, the control unit 10 executes a search process for searching the map DB 32 to identifying a road that runs along the destination. Then, in step S27, the display position of the road is calculated in the same manner as step S24. The position of the road in front of the destination is measured as an angle $\beta$.

Then, in step S28, the control unit 10 determines whether the road can be captured by the camera 12. In the process in step S28, the control unit 10 determines whether a straight view toward the destination is obstructed due to a building standing in between, a curve of the road at the current position, a distance too far to the destination or the like. The control unit 10 also determines whether the position of the road itself is out of the view angle θ even when the destination is within the view angle θ. In this case, the map information in the map DB 32 is utilized for determining whether the straight view is obstructed by the building in between.

Figure 4A:
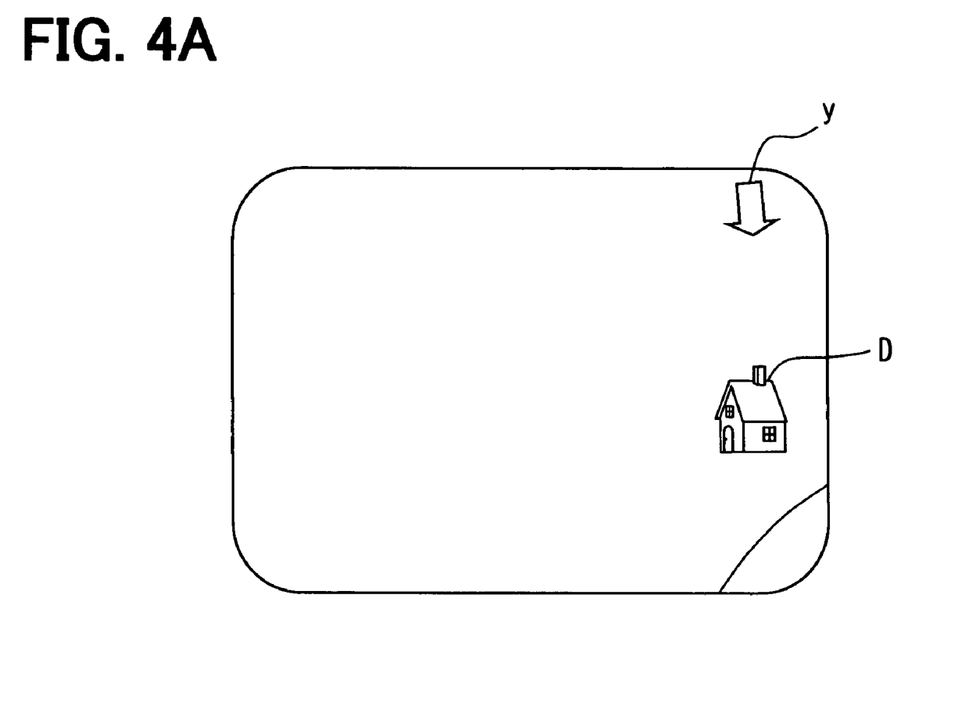
FIGS. 4A and 4B show illustrations of a destination indicated in a front view image.
Figure 4B:
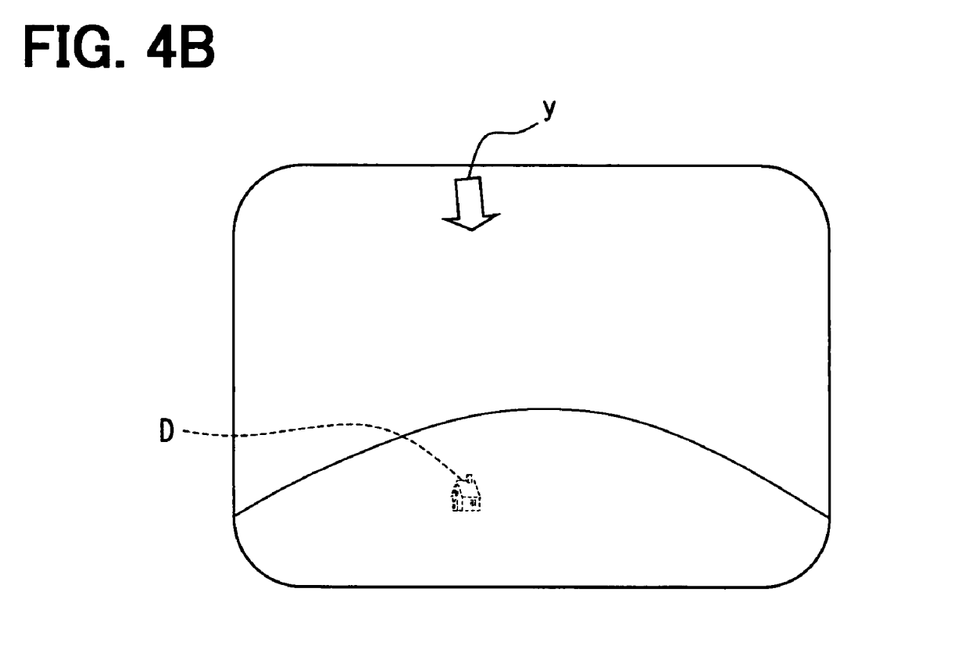
Figure 5A:
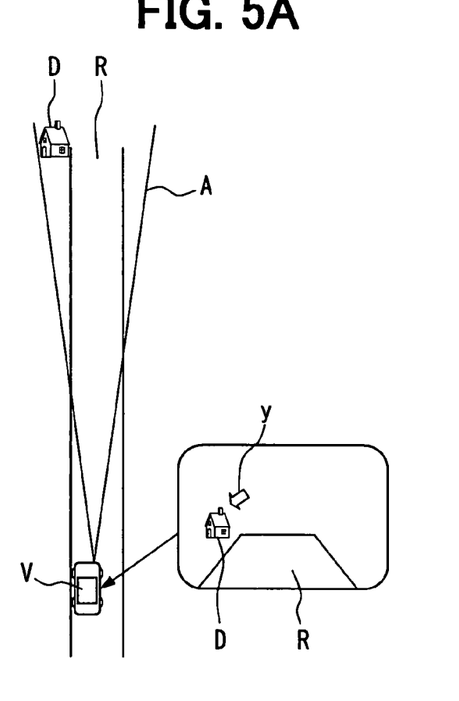
FIGS. 5A and 5B show illustrations of the destination indicated by a sizable arrow in the front view image.

When the view is obstructed (step S28:NO), the process proceeds to step S30, and displays an arrow at an upper portion of the monitor 14 for indicating the destination in the image. More practically, when the road at the destination is out of the captured image by the camera 12 due to the curve of the road as shown in FIG. 4A, or when the road at the destination is out of the image due to a distance too far or beyond a mountain or the like as shown in FIG. 4B, an arrow y is displayed at the upper portion of the destination in the image. On the other hand, when the view is not obstructed (step S28:YES), the control unit 10 in step S34 displays the arrow y at the position calculated in step S28 as shown in FIG. 5A.

Figure 5B:
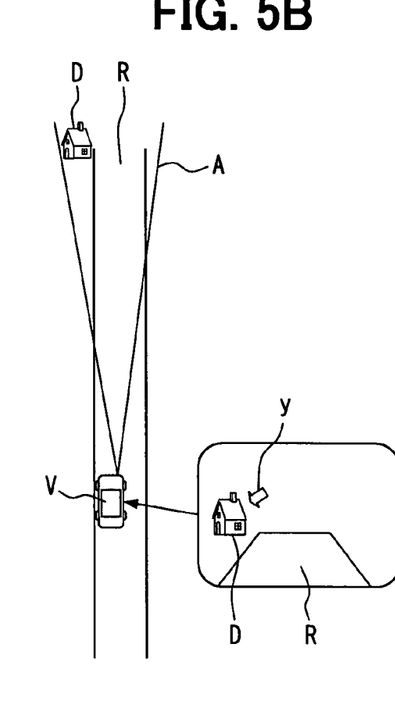

In step S36, the control unit 10 sets a size of the arrow according to the distance from the current position to the destination after determining the display position of the arrow. In the present embodiment, the size of the arrow is largest when the distance between the current position and the destination is within 100 meters. When the largest size of the arrow is taken as a standard size (i.e., a value of 1), the proportional size of the arrow is 0.8 of the standard size when the distance is within 300 meters from the destination, the size is 0.5 when the distance is within 700 meters, the size is 0.3 when the distance is within 1.3 kilometers, and the size is 0.1 when the distance is more than 1.3 kilometers. In this manner, when the destination is far from the current position, the size of the arrow y is small as shown in FIG. 5A, and when the destination is close to the current position, the size of the arrow y is large as shown in FIG. 5B.

Then, in step S38, the control unit 10 displays the captured image captured in step S20 on the monitor 14 by superposing the arrow in a specified size on the captured image.

Then, in step S40, the control unit 10 determines whether the current position reaches the destination, or whether the current position passes the destination. The process proceeds to step S44 when the current position has not reached or passed the destination (step S40:NO). The process proceeds to step S42, when the current position has reached the destination (step S40:YES).

In step S42, the control unit 10 determines whether the destination in step S40 is a final destination for the route navigation. When the destination is determined to be the final destination (step S42:YES), the navigation process concludes itself. When the destination is determined not to be the final destination (step S42:NO), the process proceeds to step S44.

In step S44, the control unit 10 determines whether the image based navigation is switched to the map based navigation by an operation of the input device 26 by the user. When switching of the navigation is detected (step S44:YES), the process returns to step S10 for providing the map based navigation. When switching of the navigation is not detected (step S44:NO), the process returns to step S20 for continuing the image based navigation.

Another embodiment of the present disclosure is described with reference to the drawings. Description of another embodiment is focused to the difference of two embodiments.

In the present embodiment, the map DB 32 stores position information including longitude, latitude and elevation, search information for searching the position information, additional information and the like in addition to the map information. The position information, the search information, the additional information and the like are associated with each other in the map DB 32.

The search information includes addresses, location names, facility names, telephone numbers for facilitating the search of the position information. The map information includes, for example, geographical features such as mountains and rivers as well as roads, buildings, municipal boundaries and the like for graphically representing the map in association with the shape of the terrain.

Figure 6:
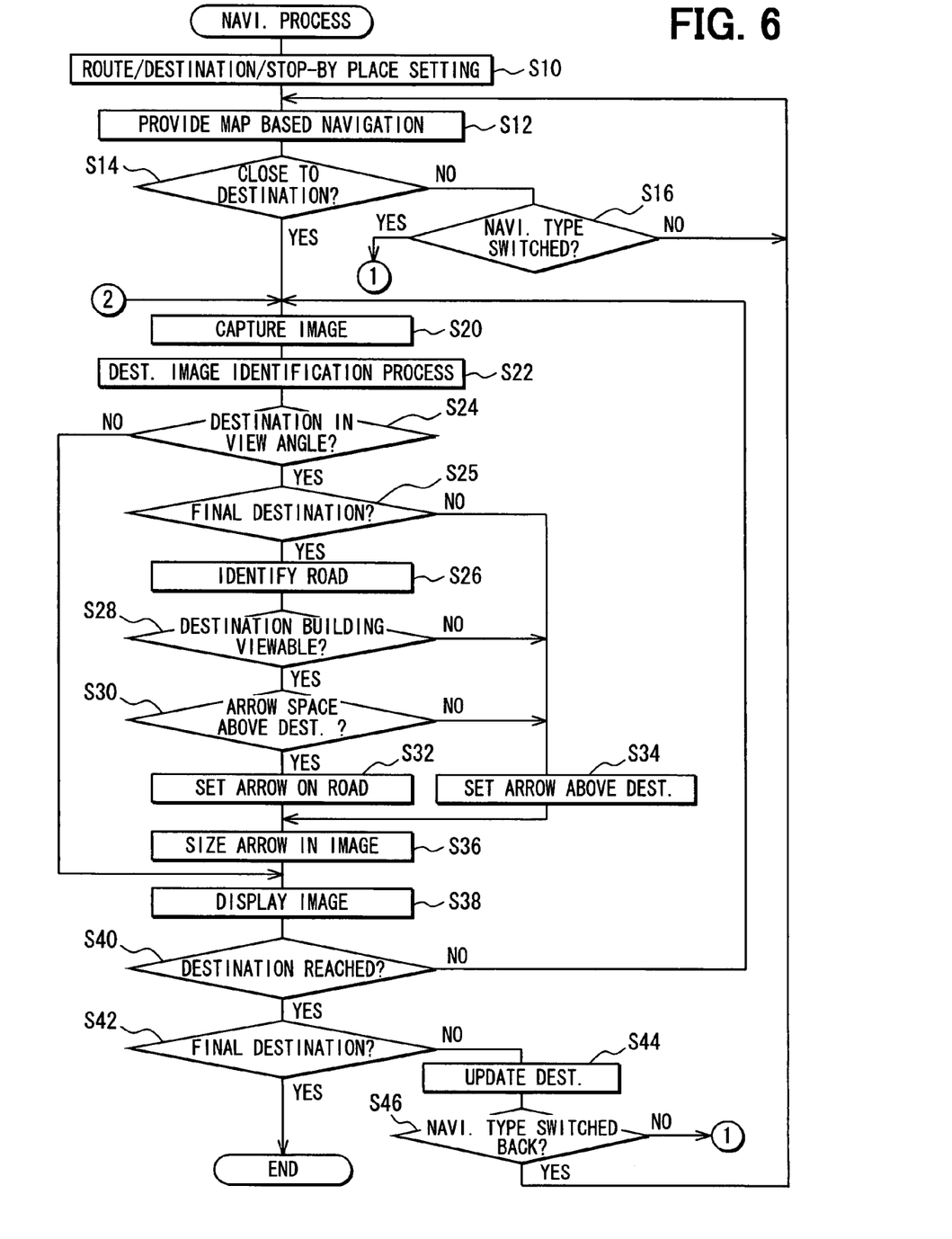
FIG. 6 shows a flowchart of the navigation process in another embodiment of the present disclosure.
Figure 7:
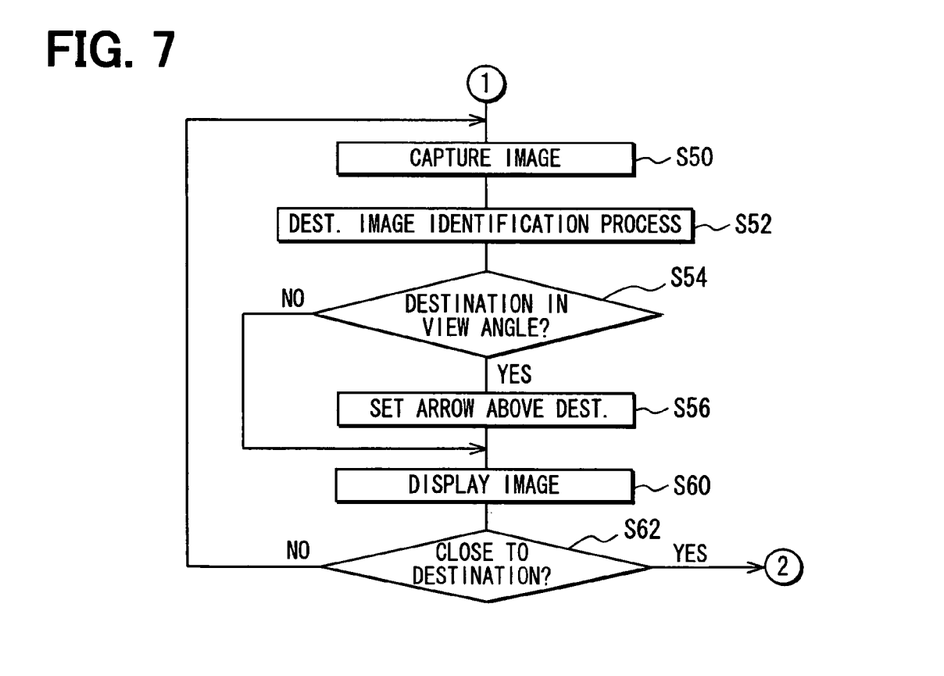
FIG. 7 shows a partial flowchart of the navigation process in another embodiment of the present disclosure.

The navigation process of the present embodiment is described with reference to the flowchart in FIGS. 6 and 7. The navigation process of the present embodiment takes substantially the same steps as the navigation process in the previous embodiment. Therefore, additional steps in the present embodiment are mainly described.

More practically, the focus of the difference of the two embodiments are following two points. That is, the partial process between steps S20 and S38 in the previous embodiment, and the additional process after switching the navigation type between the map based navigation and the image based navigation are the difference of the two embodiments.

The navigation process of the present embodiment starts with setting of the navigation route and the like in step S10. In this step, the destination of the travel and the stop-by places are defined in association with the navigation route between the current position and the destination. The final destination of the travel may be specified by searching the position information that is associated with the addresses, facility names or the like in the DB 32. The position of the destination is stored in the RAM 10c after the search. Further, intersections on the navigation route are set as the stop-by places in the RAM 10c after being extracted from the DB 32.

Then, the map based navigation is provided in step S12, and closeness to the destination is determined in step S14.

Then, in step S16, switching of the navigation type (map base/image base) is determined. The process proceeds to step S50 when the navigation type is switched (step S16:YES). The steps S50 and after in the additional process are described later. The process returns to step S12 when the navigation type is not switched (step S16:NO).

Then, in step S20, the camera 12 is used to capture the image of the front view.

In step S22, the destination image identification process is executed. That is, the destination is identified either as an image of an intersection or as an image of a building. More practically, the destination is shown as an intersection image in the frown view captured by the camera 12 when the vehicle is approaching one of the intersections (i.e., the stop-by places on the navigation route), or the destination is shown as the building image in the front view when the vehicle is approaching the final destination. The position of the destination image is determined by calculating the angle α as shown in FIG. 2, because the position of the destination is defined as a intersecting point of a look of the driver with a vertical plane at the destination.

Then, in step S24, the process determines whether the destination is in the view angle. The process proceeds to step S25 when the destination is in the view angle (step S24:YES). The process proceeds to step S38 when the destination is not in the view angle (step S24:NO).

Then, in step S25, the process determines whether the destination is the final destination. The process proceeds to step S26 when the destination is in the view angle (step S25:YES). The process proceeds to step S34 when the destination is not in the view angle (step S25:NO).

Then, in step S26, the process searches and identifies the road that runs along the destination. More practically, the process calculates the angle β in FIG. 2 for defining the road position at the destination in the front view. In the present embodiment, the destination of the travel is a building, and the road position in front of the building at the destination is defined by calculating the angle β, because the look of the driver intersects with a vertical plane assumed to be standing at the destination.

Then, in step S28, the process determines whether the building of the destination is viewable from the camera 12. That is, for example, the process determines whether the building of the destination is obstructed by another building or the like in the front view based on the information in the DB 32 and the current and destination position. The process proceeds to step S30 when the building of the destination is viewable (step S28:YES). The process proceeds to step S34 when the building of the destination is not viewable (step S28:NO).

Then, in step S30, the process determines whether the arrow indicative of the road position of the destination is synthesizable in an upper portion of the front view. In other words, the view angle θ covers the angle β of the road position in the front view. The process proceeds to step S32 when the road position is in the view angle (step S30:YES). The process proceeds to step S34 when the road position is not in the view angle (step S30:NO).

Then, in step S32, the process is configured to set the arrow y in the upper portion of the front view as shown in FIGS. 5A and 5B before proceeding to step S36.

Figure 8A:
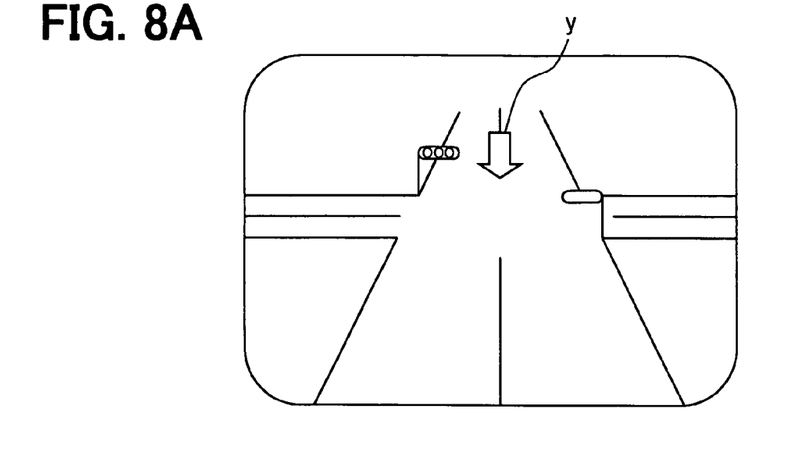
FIGS. 8A to 8C show illustrations of an arrow indicative of the destination.
Figure 8B:
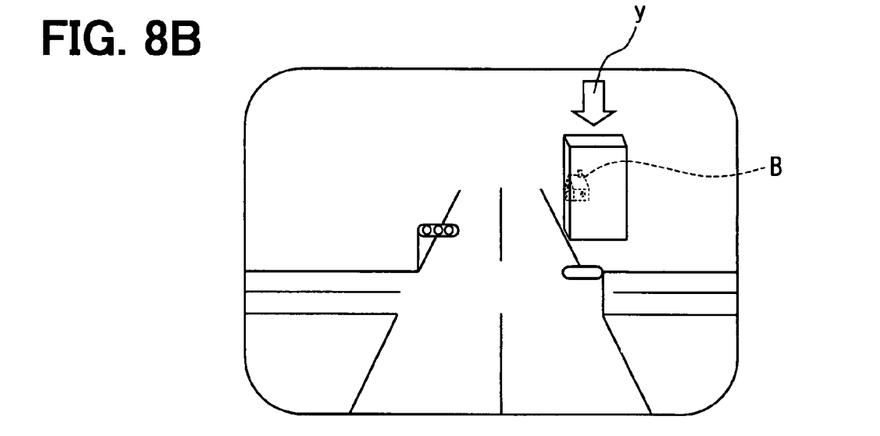
Figure 8C:
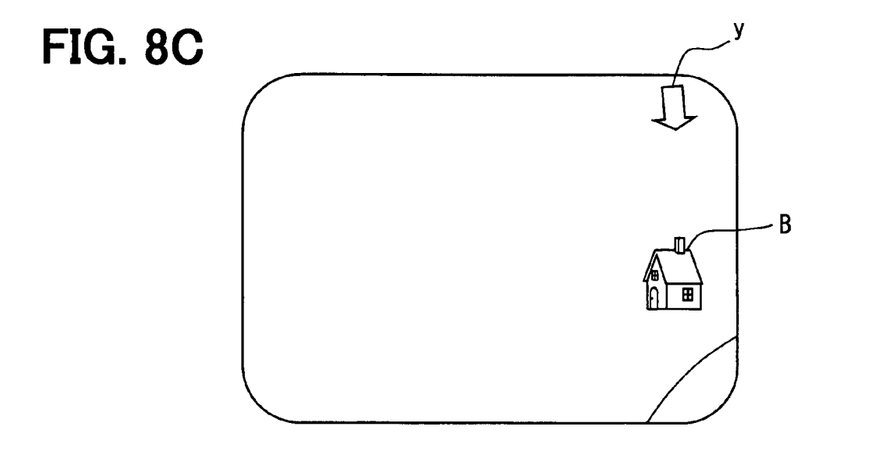

In step S34, the process sets the arrow y above the destination in the front view. More practically, the arrow y is synthesized in the front view to appear above at the intersection in the front view when the vehicle is not approaching the final destination as shown in FIG. 8A based on the determination in step S25, or the arrow y appears above at the destination when the building (B) of the destination itself is hidden behind another building as shown in FIG. 8B based on the determination in step S28. Further, the arrow y appears over the building (B) of the destination as shown in FIG. 8C when the arrow y is not synthesizable at the road destination of the destination in step S30.

Then, in step S36, the process sizes the appearance of the arrow y according to the distance from the destination. The proportional sizing of the arrow y is executed in the same manner as the previous embodiment.

The rest of the main path of the navigation process is executed substantially in the same manner as the previous embodiment after step S38. However, when the process determines that the vehicle has not reached the destination in step S40 (step S40:NO) by examining the current position relative to the destination used in the previous step S14, the process returns to step S20. In addition, after determining that the vehicle has not reached the final destination in step S42 (step S42:NO), the process updates the position of the destination stored in the RAM 10c to a next one (i.e., either to the next stop-by place or to the final destination) in step S44, and further determines whether the navigation type is switched back to the map based navigation in step S46. When the navigation type is switched back to the map based navigation by using the input device 26 (step S46:YES), the process returns to step S12. When the navigation type is not switched back to the map based navigation (step S46:NO), the process proceeds to step S50.

The additional process after step S50 is described in the following with reference to the flowchart in FIG. 7. The steps in the additional process in FIG. 7 are understood as a subset of the main path described in FIG. 6. That is, in step S50, the process uses the camera 12 to capture the front view. In step S52, the process executes the destination image identification process in the same manner as in step S22. In this case, the position of the destination is identified for showing the arrow y, even though the additional process after step S50 is executed based on the determination that the position of the destination is either too far from the current position to be represented in the front view at current image resolution, or behind a mountain to appear in the front view.

In step S54, the process determines whether the position of the destination is in the view angle (i.e., whether the angle θ covers the angle α). The process proceeds to step S60 when the destination is not in the view angle (step S54:NO). The process proceeds to step S56 when the destination is in the view angle (step S54:YES).

In step S56, the process sets the arrow y above at the destination in the angle α. Then, in step S60, the process displays the front view of the vehicle with the arrow y synthesized therein for indicating the destination on the monitor 14 when the destination is determined in the view angle in step S54. Otherwise, the process displays the front view as it is captured by the camera 12 on the monitor 14.

In step S62, the process determines whether the vehicle is approaching the destination. The process returns to step S20 when the destination is close (step S62:YES). The process returns to step S50 when the destination is not close (step S62:NO).

Figure 9:
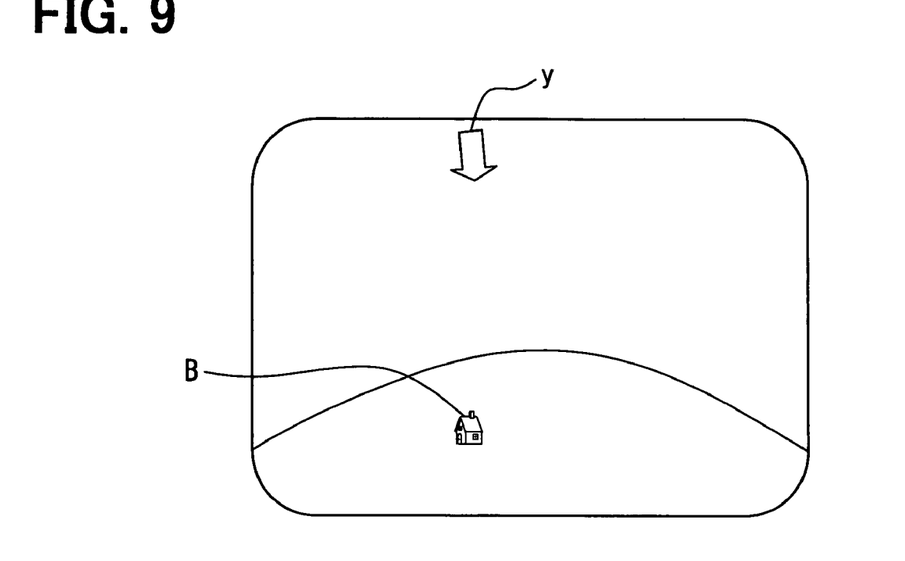
FIG. 9 shows an illustration of the arrow indicative of the destination at a distant position.

The additional steps of S50 to S62 show the front view with a marking of the destination synthesized therein on the monitor 14 as shown in FIG. 9 even when the building (B) of the destination is either far (i.e., small in the front view) or behind a mountain.

The car navigation apparatus 1 of the present disclosure is advantageous over similar apparatuses in the following points. That is, the driver of the vehicle can identify the destination of the travel in the front view only by glancing the arrow synthesized in image. Therefore, the driver's attention is not distracted from the driving operation, thereby improving the drivability of the vehicle. Further, the closeness to the destination is intuitively represented by the size of the arrow in the image, thereby conveying the sense of closeness to the destination for the driver without causing additional recognition load. Furthermore, the closeness or detachment of the building at the destination from the road is intuitively conveyed to the driver only by glancing the image of the front view with the assistance of the arrow indicative of the road position in front of the destination. Furthermore, the map based navigation is switched to the image based navigation when the vehicle approaches the destination, thereby intuitively conveying the sense of the closeness to the destination for the driver. Furthermore, the arrow for indicating the destination is synthesized in an open space above the destination in the front view, thereby improving the ease of recognition by the driver. In addition, even when the building at the destination is not directly viewable in the front view, i.e., from the driver, the non-viewable position of the destination is indicated by the arrow in the image, thereby intuitively conveying the "non-viewability" of the destination in the image.

The conventional car navigation apparatus generally stops provision of navigation guidance when the vehicle approaches the destination to a certain extent. However, precisely and accurately guiding the approach of the vehicle and the driver to the destination is an essential part of the navigation. Therefore, in the present disclosure, the switching of the map based navigation to the image based navigation simultaneously achieves both improvements of lessening the driver's load at pre-approaching stage to the destination by providing a large scope of navigation with the map and improving preciseness of the navigation by providing accurate images of the "landing place" of the vehicle based on the real-time captured image of the destination.

Although the present invention has been fully described in connection with the preferred embodiment thereof with reference to the accompanying drawings, it is to be noted that various changes and modifications will become apparent to those skilled in the art.

For example, the camera 12 is disposed on the sun visor, the camera 12 may be disposed on top of the instrument panel, on an edge of a headrest, or any other position that can produce a front view of the driver.

Further, the stop-by places may be utilized for selection of plural lanes. That is, for example, when a portion of the navigation route to the destination has plural lanes, the portion of the route is specified as one of the stop-by place, and an appropriate lane toward the destination of the navigation route may be indicated by displaying the arrow in the image when the vehicle approaches the portion of the route.

Furthermore, the arrow for indicating the destination may be replaced with other graphic effects. That is, the brightness of the destination in the image may be increased or decreased. The destination might also be displayed in a circle, in a rectangle or the like in the image. The shape of the arrow may be replaced with, for example, a pointing hand or the like.

Furthermore, the closeness to the destination may be determined based on an inclusion of the destination in the image captured by the camera 12 instead of using a predetermined distance toward the destination. The inclusion of the destination in the image may be determined based on the position of the road in the map DB 32, the current position of the vehicle and the position of the destination.

Figure 10:
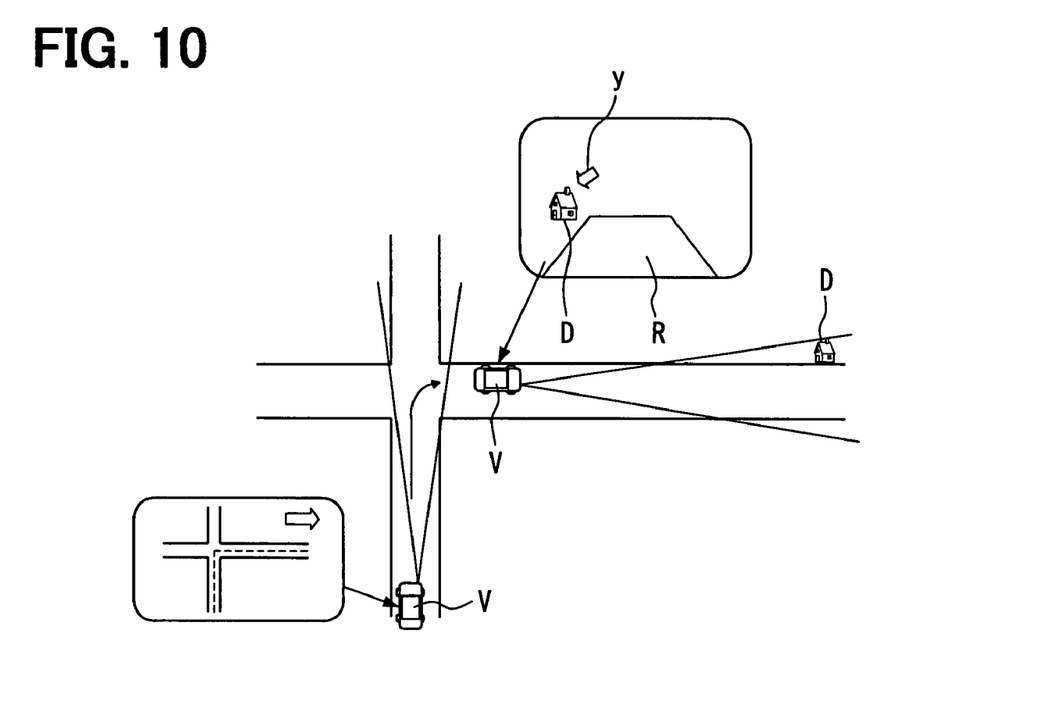
FIG. 10 shows an illustration of switching map based navigation to image based navigation.

When the inclusion of the destination is calculated based on the map information and the position information, the map based navigation at a lower left position in FIG. 10 can be switched to the image based navigation at an upper right position in FIG. 10 based on the inclusion of the destination the view angle of the image.

Furthermore, the arrow for indicating the destination on the monitor 14 may be accompanied by an illustrative text that displays a facility name, a location name or the like.

Furthermore, the closeness determined in step S14 in another embodiment based on the predetermined distance to the destination may be replaced with other criteria. That is, the vehicle may be determined to be close to the destination when the road from the current position to the destination is detected as a straight road.

Furthermore, the stop-by places may be specified by the input of the driver or the user of the apparatus. In addition, the stop-by places may includes various places such as a place of interest, a viewing point or the like.

Furthermore, the final destination may be a geographical feature such as a mountain, a river, or any other point.

Furthermore, the road position of the destination may be identified as a specific side, that is, either on the right or left, relative to the traffic on the road based on the information in the DB 32.

Furthermore, the present disclosure may not only applicable to the left side traffic, but also to the right side traffic, if the right-left dependent features are reversed.

Such changes and modifications are to be understood as being within the scope of the present invention as defined by the appended claims.

What is claimed is:

1. A navigation apparatus for providing a navigation route toward a destination for a vehicle comprising:
    a camera for capturing an image of a front view of the vehicle;
    a monitor for displaying the image of the front view of the vehicle;
    a position detector for detecting a current position of the vehicle;
    a direction sensor for sensing an imaging direction of the camera;
    a destination position setting unit for specifying a destination image section in correspondence to the destination in the image of the front view captured by the camera, wherein the camera aims in the imaging direction sensed by the direction sensor;
    a processing unit for processing the image of the front view for viewing on the monitor to add a graphic effect indicative of the destination position to the image of the front view;
    a map guidance unit for displaying on the monitor a map image that represents the current position on a map around the current position in association to the navigation route; and
    a closeness detection unit for detecting closeness from the current position to the destination,
    wherein the processing unit switches the map image displayed by the map guidance on the monitor to the image of the front view being processed by the processing unit when the closeness detected by the closeness detection unit meets a certain criterion that determines that the vehicle is close to the destination.

2. The navigation apparatus as in claim 1,
    wherein the closeness detection unit uses a predetermined distance as the criterion of closeness.

3. The navigation apparatus as in claim 1,
    wherein the closeness detection unit uses a condition that a road between the current position and the destination is straight as the criterion of closeness.

4. A navigation apparatus for use in a vehicle comprising:
    a position detector for detecting a current position of the vehicle;
    a destination determiner for determining a destination of a navigation route;
    a camera for capturing an image of a front view of the vehicle;
    a monitor for displaying the image of the front view of the vehicle;
    an angle memory for storing a view angle of the camera;
    a direction sensor for sensing an imaging direction of the camera;
    a destination position setting unit for specifying a destination position in the image of the front view captured by the camera, wherein the camera aims in the imaging direction sensed by the direction sensor with the view angle stored in the angle memory;
    a processing unit for processing the image of the front view for viewing on the monitor to add a graphic effect indicative of the destination position to the image of the front view;
    a map guidance unit for providing route navigation by outputting a map with the current position of the vehicle superposed thereon to the monitor;
    a closeness determination unit for determining closeness of the current position to the destination; and
    a switch unit for switching the map provided by the map guidance unit to the image processed by the first processing unit based on the closeness determined by the closeness determination unit.

5. The navigation apparatus as in claim 4, wherein the closeness determination unit uses a predetermined distance value as a criterion for determining the closeness of the current position to the destination.

6. The navigation apparatus as in claim 4 further comprising:

a map storage unit for storing map information that includes road position information, the closeness determination unit determine the closeness of the current position to the destination on a condition that the destination is viewable in the image of the front view captured by the camera in the view angle stored in the angle memory in addition to a condition that the current position and the destination are interposed only by the nearby road based on the road position determined by the road positioning units.

* * * * *